United States Patent [19]
Roska et al.

[11] Patent Number: 5,355,528
[45] Date of Patent: Oct. 11, 1994

[54] REPROGRAMMABLE CNN AND SUPERCOMPUTER

[75] Inventors: Tamas Roska, Budapest, Hungary; Leon O. Chua, Berkeley, Calif.

[73] Assignee: The Regents of the University of California, Oakland, Calif.

[21] Appl. No.: 959,562

[22] Filed: Oct. 13, 1992

[51] Int. Cl.$^5$ .............................. G06F 15/18
[52] U.S. Cl. ........................ 395/24; 395/20; 395/22; 395/27
[58] Field of Search ............ 395/24, 25, 22, 23

[56] References Cited

U.S. PATENT DOCUMENTS

| | | | |
|---|---|---|---|
| 4,947,482 | 8/1990 | Brown | 395/24 |
| 4,962,342 | 10/1990 | Mead et al. | 375/24 |
| 5,058,184 | 10/1991 | Fukushima | 395/24 |
| 5,140,670 | 8/1992 | Chua et al. | 395/24 |

OTHER PUBLICATIONS

Leon O. Chua and Lin Yang; "Cellular Neural Networks: Theory and Applications"; IEEE Transactions on Circuits and Systems, vol. 35, No. 10, Oct. 1988, pp. 1257-1290.

J. M. Cruz and L. O. Chua; "A CNN Chip for Connected Component Detection"; IEEE Transactions on Circuits and Systems, vol. 38, No. 7, Jul. 1991, pp. 812-817.

Leon O. Chua; "The Genesis of Chua's Circuit"; AEU, vol. 46, No. 4, 1992, pp. 250-257.

Various; *1990 IEEE International Workshop on Cellular Neural Networks and Their Applications-CNNA-90 Proceedings;* Hotel Agro, Budapest, Hungary, Dec. 16-19, 1990, pp. 1-313, (IEEE 90TH0312-9).

*Primary Examiner*—Allen R. MacDonald
*Assistant Examiner*—Richemond Dorvil
*Attorney, Agent, or Firm*—Allston L. Jones

[57] ABSTRACT

This invention has 3 parts. Part 1 proposes a new CNN universal chip architecture with analog stored programs and time-multiplex templates. This breakthrough replaces hundreds of dedicated CNN chips with a single programmable, real-time VLSI chip with comparable significance to the invention of the microprocessor which gave birth to the personal computer industry. Part 2 proposes a unique wireless non-optical method for outputting information from the CNN analog array via electromagnetic waves generated by nonlinear oscillations and chaos. Part 3 combines a set of analog, or digitally emulated, CNN universal chips to design a CNN array supercomputer capable of solving nonlinear partial differential equations (e.g., wave type, Navier-Stokes-type, etc.) at a fraction of the time or cost required by current digital supercomputers. Indeed, "programmable physics" or "programmable bionics" can be implemented.

9 Claims, 8 Drawing Sheets

REPROGRAMMABLE CNN AND SUPERCOMPUTER

GOVERNMENT RIGHTS

This invention was made with Government support under Contract No. N00014-89-J-1402, awarded by the Office of Naval Research, and Grant No. MIP-8912639, awarded by the National Science Foundation. The Government has certain rights in this invention.

CROSS-REFERENCE

This invention is related to an earlier filed patent application entitled "CELLULAR NEURAL NETWORK", having been assigned Ser. No. 07/417,728, filed on Oct. 5, 1989, now U.S. Pat. No. 5,140,670 by Leon O. Chua aid Lin Yang, and assigned to the same assignee as is the present patent application.

FIELD OF THE INVENTION

The present invention relates to cellular neural networks (CNN), and more particularly to a fully programmable CNN which can be used as a supercomputer.

BACKGROUND OF THE INVENTION

A cellular neural network (CNN) is a multidimensional lattice array of a plurality of identical cells. In a two-dimensional planar array of cells, the array may be either square, rectangular, hexagonal, etc. For the 3-dimensional case, the array in any direction can have one or more cells, i.e., there does not have to be the same number of cells in each of the 3-dimensions of the array. With respect to any single cells, the cells closest to it are its neighbor cells. Additionally, the neighbor cells of each cell expand concentrically from that single cell as layers of neighbors. Each cell in the array interacts directly non-linearly and in continuous time (possibly delayed) within a prescribed number (r) of r-neighborhood layers of its neighborhood of cells within the lattice. The r-neighborhood is also called a "receptive field of radius r." Cells not directly connected together may affect each other indirectly because of the propagation effects of the CNN. A CNN is capable of high-speed parallel signal processing.

In a two dimensional, single-plane CNN, each neighborhood of cells will also be two dimensional and be a sub-set of the cells in the single-plane of the CNN. In a three dimensional CNN, there will be at least two planes of CNNs and the layers of neighbor cells may be either restricted to the single plane in which they are physically located, or the layers of neighbor cells could also be three dimensional and incorporate portions of several planes much like layers of an onion. The actual application dictates whether the layers of neighbor cells are two or three dimensional.

The basic unit of a CNN is the cell. Each cell contains linear and nonlinear circuit elements, which may include linear capacitors, linear inductors, linear resistors, linear and nonlinear controlled sources, and independent sources. Further, the application specific cloning template determines the interconnection of the cells and cell planes. In the past, if a different application was desired the ICs that incorporate the cells would have to be interchanged for other ICs for cells that have been interconnected in accordance with the cloning template for the new application.

If a CNN can be made programmable without the need to substitute hardware components in order to do so then a CNN would become an analog supercomputer that could be faster than digital supercomputers which are currently available. The present invention makes that a reality.

SUMMARY OF THE INVENTION

The CNN universal machine of the present invention is a cellular analog stored-program multidimensional array computer with local analog and logic memory, analogic computing units, and local and global communication and control units. The global analog stored-program memory concept is a key element of the CNN universal chip architecture providing the implementation of analogic algorithms using time-multiplex templates. Though, as implementation examples we consider mainly IC realizations, many other implementations are possible (optical, chemical, biological, etc.).

The CNN machine of the present invention is universal in the same sense as a Turing machine except that all of the signals are analog, not digital. However, the so called dual computing structure in the architecture of the present invention allows a direct combination of analog and logic signals, without any analog-digital conversion.

As a special case, the unit of a modified canonical chaos circuit is outlined for the analog processing element of the CNN array.

A high input throughput rate can be realized by the present invention by implementing sensory arrays directly at the processing cells. On the other hand, at the output, a wireless EM Wave detector could be used to increase the throughput rate further. This is made possible by using oscillation and chaos for detecting certain features.

The third key element of the present invention is the use of the analog, or digitally emulated, CNN universal chip architecture in an array to form a CNN array supercomputer. This can be used for solving a very broad class of nonlinear partial differential equations (PDEs) at a fraction of the time or cost of using an existing supercomputer. The Laplace, the diffusion, the wave, the Navier-Stokes, and other types of PDEs can efficiently be solved by the CNN array supercomputer of the present invention.

The invention of this genuinely new architecture of the present invention can, depending on the application, include a CNN array with possible nonlinear and delay-type templates as the nucleus, dual computing CNNs, a chaos circuit, and it was equally motivated by living systems such as the hemispheric cerebral asymmetry of the brain, the multi-projection property of the visual system, etc. Thus, the unique analogic algorithms of the universal CNN machine of the present invention can also serve as prototype modelling tools for a broad class of biological and cognitive processes.

BRIEF DESCRIPTION OF THE DRAWINGS

FIG. 3b is an expanded block diagram of a single cell of the CNN machine of FIG. 3a.

FIG. 3c is an expanded block diagram of the GAPU of FIG. 3a.

DESCRIPTION OF THE PREFERRED EMBODIMENT

Figure 1:
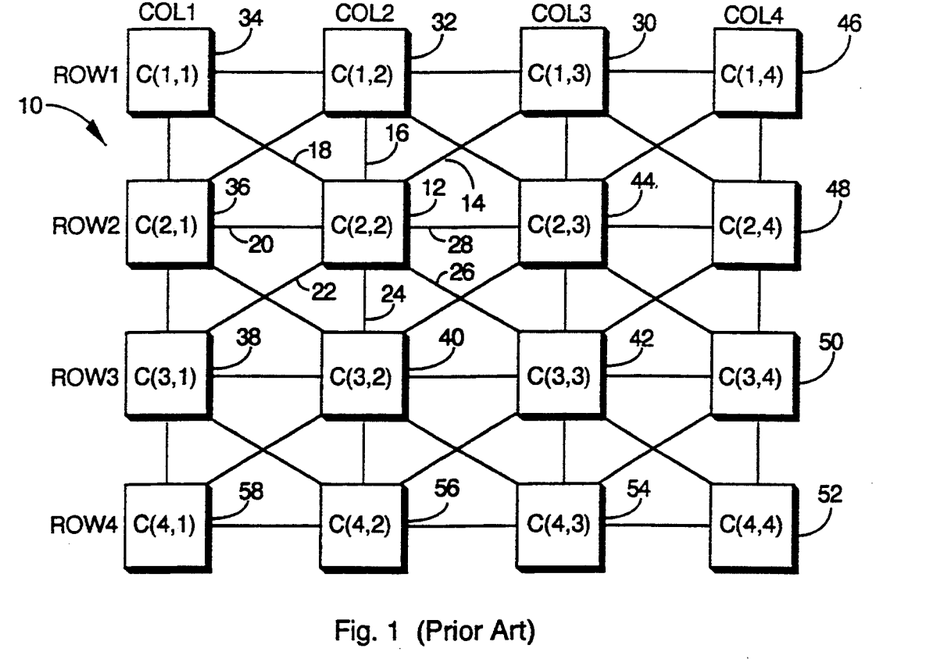
FIG. 1 is a two-dimensional simplified block schematic diagram of the prior art of a single-plane cellular neural network of the prior art showing a CNN having the interconnections between cells being only to the nearest neighbors.

Referring to FIG. 1, there is shown a 4×4 two-dimensional cellular neural network of the prior art by way of illustration. The cells C(i,j) are shown here in a square array of four rows and four columns with "i" representing the row number and "j" representing the column number. In FIG. 1, there are sixteen cells each shown schematically as being interconnected only to its nearest neighbors, i.e., the first layer of neighbor cells. For example, cell 12 {C(2,2)} is shown interconnected with cells 30–44 by links 14–28, respectively. Each of links 14–28 shown here are bi-directional between the two cells to which that link is connected. In this example, there is only one layer of neighbor interconnects between the cells with cells 30–44 substantially forming a circle around cell 12. If there were a second layer of neighbor interconnects, cell 12 would similarly also be interconnected with cells 46–58. This layer of neighbor cells forms only a partial circle due to the limited size of the CNN in this example.

Figure 2:
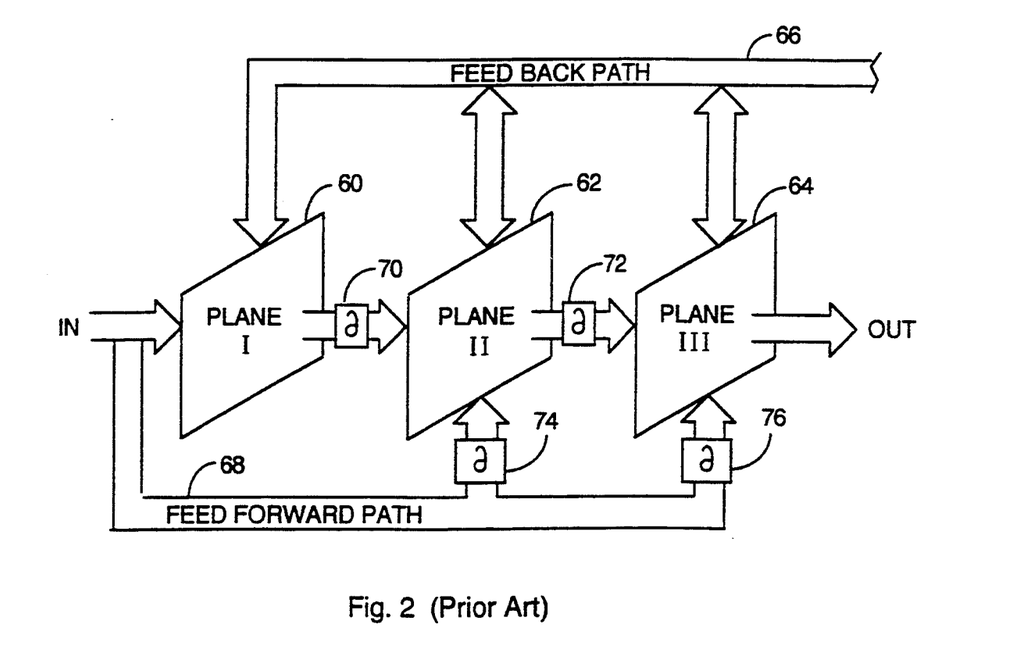
FIG. 2 is a block schematic representation of the interconnection between the planes of a multi-plane CNN of the prior art.

Referring to FIG. 2, there is shown a typical schematic representation of a multi-plane CNN of the prior art having planes 60–64. The input signal is shown being applied directly to plane 60 and feed forward path 68, and via delays 74 and 76 to planes 62 and 64, respectively. In addition, the output signal from plane 60 is applied to plane 62 via delay 70, and the output signal from plane 62 is applied to plane 64 via delay 72. Finally, there is a feedback path 66 for feeding back signals from plane 64 to plane 62, and from plane 62 to plane 60. In this implementation, the value of delay, for each of delays 70–76 is substantially equal.

The CNN universal machine and supercomputer of the present invention provides at least three new capabilities; the analog stored program and the time-multiplex operation of layers, the wireless detection, and flexible representation of various PDEs using a chaos circuit, or other cell circuit.

Table I summarizes several types of CNNs according to grid types, processor types, interaction types, and modes of operation. This table will undoubtedly expand as additional techniques and applications are identified. Additionally there are several other issues, e.g. template design and learning, physical implementations, qualitative theory, accuracy, and vast areas of applications.

Present Invention Architectures

First, the CNN of the present invention can be defined as an analog cellular nonlinear dynamic processor array characterized by the following features:

(i) analog processors that process continuous signals, that are continuous-time or discrete time signals (i.e., the input, output, and state variables are $C^k$ functions at least for finite intervals), the processors are basically identical (a single term of them may vary regularly);

(ii) the processors are placed on a 3D geometric cellular grid (several 2D planes);

(iii) the interactions between the processors are mainly local, i.e., each processor is interacting with others within a finite neighborhood (nearest neighbor is just a special case), and mainly translation invariant defined by the cloning template (the dynamics of a given interaction may be a design parameter);

(iv) the mode of operation may be transient, equilibrium, periodic, chaotic, or combined with logic (without A-D conversion).

Part 1

The prior art CNN array 10 (see FIG. 1), with some elementary logic additions, is used as a nucleus for the new architecture of the present invention. However, the following additional features and circuit elements are responsible for universal capabilities of the machine of the present invention. Analog two or three dimensional array-signals which assume continuous values in continuous or discrete-time over an interval are used in the present invention.

Figure 3A:
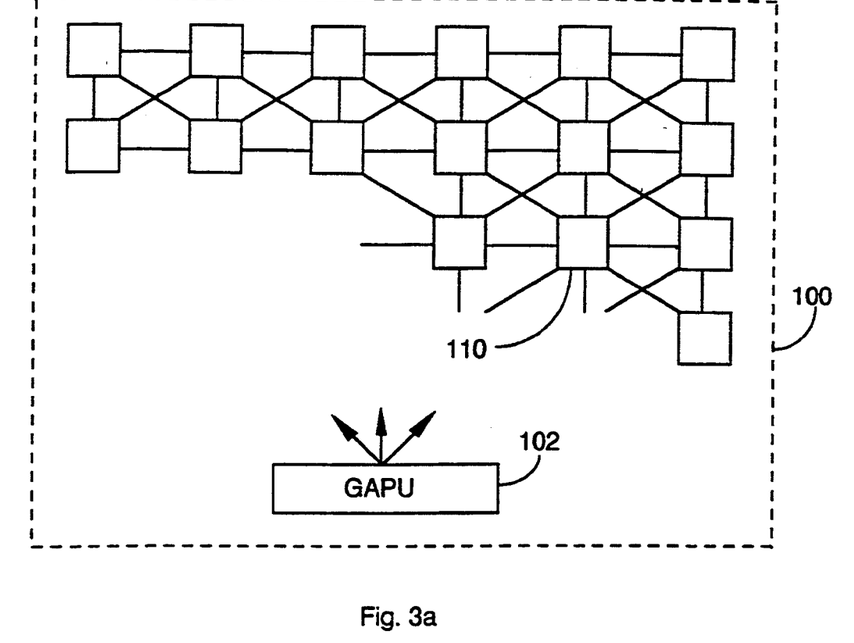
FIG. 3a is a graphical illustration of a plane of a universal CNN machine of the present invention.

Referring to FIG. 3a, there is shown a partial block diagram of the CNN universal chip 100 of the present invention. This chip architecture can be divided into two distinct regions as shown in FIG. 3a. In the upper portion of FIG. 3a there is what appears to be the familiar CNN structure of the prior art as shown in FIG. 1, and in the lower portion there is a block representation of the global analogic programming unit (GAPU) 102 which is discussed further below.

As is well known in the CNN art, and which carries over here, is that the grid of individual cells 110 as shown in FIG. 3a as being rectangular, could be any two-dimensional configuration (triangular, hexagonal, polygonal, etc.). This is more application dependent than theory dependent. Additionally, as was true in the prior art, it is also true here, different grid sizes and shapes can be used for different planes in a multi-plane CNN (e.g. to simulate the magno and parvo cells in the living visual systems).

A connection radius of r=1 is shown in the upper portion of FIG. 3a for simplicity. It should be understood that, without loss of generality, larger radius values can be implemented in the same way to increase the connection density as necessary.

In fact, the universal chip architecture illustrated in FIG. 3a represents the functional architecture of the CNN universal machine of the present invention in two senses: (1) several CNN universal chips 100 (e.g. planes 60–64 in FIG. 2) stacked upon each other results in a three dimensional universal CNN machine of the present invention, and (2) several two-dimensional "planes" (as in FIG. 1) of a three-dimensional CNN machine of the present invention can be implemented on the CNN universal chip architecture of the present invention with time multiplexing using local analog and logic memory registers. To further broaden the cell capacity of a physical CNN universal chip, several chips can be placed next to each other on a planar substrate with only the border cells on one chip connected to border cells on an adjacent chip as if all of the cells had been on the same larger chip. If the feedback/feedforward signals of the CNN are to be connected to more than just the first layer of neighbor cells then the border cells of each of the adjacent cells would also have to be connected to the appropriate additional cells on each chip as if those cells were each on the same chip. For multiple plane CNNs there needs be only one GAPU.

Figure 3B:
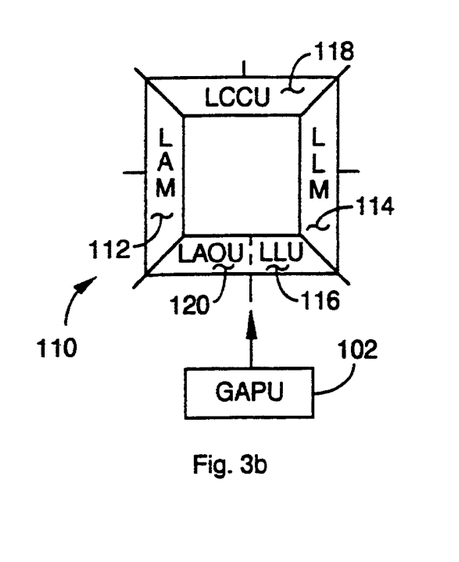

An expanded view of any and every CNN cell 110 of FIG. 3a is shown in more detail in FIG. 3b. In addition to the nucleus of the single cell which is equivalent to the CNN cell of the prior art, there are several additional analog and logical circuit elements associated with each cell. It should be noted here that "logical" and "digital" are not to be equated with each other. A digital circuit includes various gates and registers to code $2^n$ values (e.g. decimal, hexadecimal, etc.), whereas a logical circuit processes logical values without coding.

The additional circuit elements in each cell of the CNN universal machine of the present invention are a local analog memory unit (LAM) 112, a local logic memory register (LLM) 114, a local logic unit (LLU) 116, a local communications and control unit (LCCU) 118, and a local analog output unit (LAOU) 120. In operation the LAM 112 cell values are combined by the LAOU 120 while the logic register values are combined by the LLU 116. The LCCU 118 provides the control of the cell configuration and the analog and logic instruction communication. The operation of the enhanced CNN cell of the present invention and each of these elements is discussed in greater detail with respect to FIGS. 4a and 4b below.

Figure 3C:
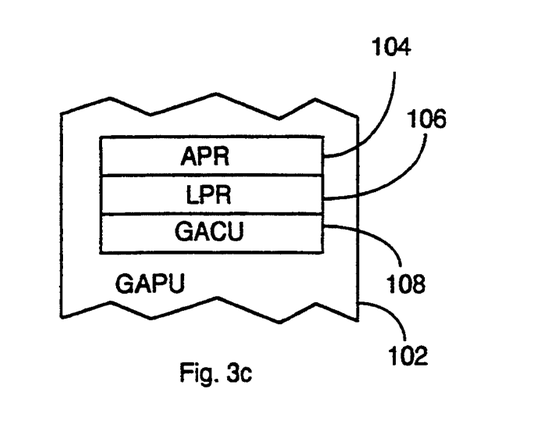

The global analogic programming unit (GAPU) 102 controls the entire chip 100 and is shown in more detail in FIG. 3c. Here it can be seen that GAPU 102 has four constituent parts, an analog program register (APR) 104, a logical program register (LPR) 106, an optional switch configuration register (SCR) 115 and a global analogic control unit (GACU) 108. Thus it can be seen that GAPU 102 is a "dual" unit with both analog and logical components, but without A-D converters. It is used to control the identical functions of all cells and the sequences of these functions, namely:

the analog template elements;
the function of LLU 116;
the cell configurations (including the selection within LAOU 120);
the start of the different units.

The operation of GAPU 102 and each of the elements that it contains will be discussed in relation to FIG. 5 below.

If the implementation of the overall CNN universal machine is done on multiple chips, then several of GACUs 108 can be used in an array partitioning GAPU 102 between the chips working together with a central GAPU 102. In such an implementation APR 104 can also be divided to form an analog cache register.

Figure 4A:
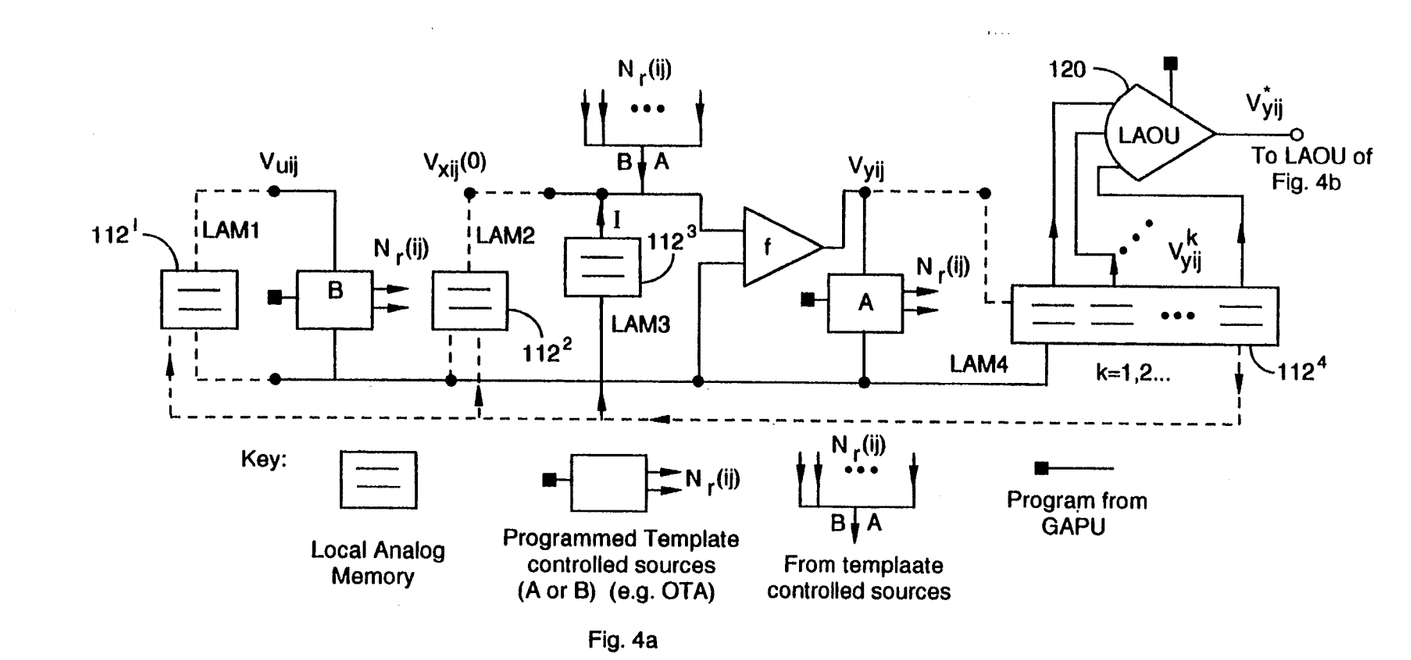
FIGS. 4a and 4b together present a schematic representation of an equivalent circuit of a single enhanced CNN cell of the present invention as in FIG. 3b.
Figure 4B:
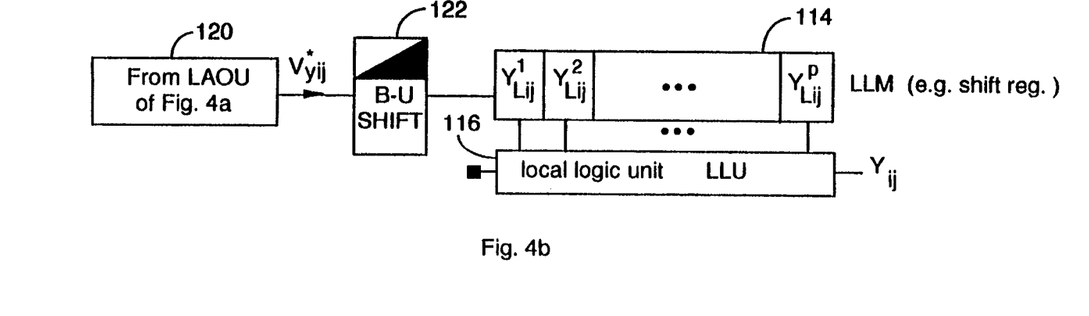

FIGS. 4a and 4b together present a schematic diagram of an equivalent circuit representation of a typical individual cell 110 (see FIG. 3b) of the present invention. In this diagram the suffixes u, x and y denote the input, state and output, respectively, of the cell. Additionally, node voltage $v_{xij}$ is called the state of the cell, node voltage $v_{uij}$ is called the input of the cell, the node voltage $v_{yij}$ is called the output of the analog portion of the cell, and $Y_{ij}$ is the logical output of the cell.

Templates A and B define the feedback and feedforward, respectively, between neighbor cells and are programmable via GAPU 102. They each may contain variable gain amplifiers with the gain values being received externally. At the input, sequentially, various values of node voltage $v_{uij}$, the input signals, are stored as analog signals locally in LAM1 $112^1$. Similarly, the initial state, $v_{xij}(0)$, is also stored locally as an analog signal in LAM2 $112^2$, and subsequent state values are stored sequentially as analog signals in LAM3 $112^3$. Finally, several consecutive output values, $v_{yij}$, are stored as analog signals in LAM4 $112^4$. Once at least one result is present in LAM4 $112^4$, it can be used as an input or initial state to LAOU 120, meanwhile different B and A templates can be programmed to calculate iterative instructions. In very high speed applications LAM4 $112^4$ could be an analog delay line. Now, after several consecutive results have been sorted in LAM4 $112^4$, they are combined by LAOU 120 to calculate an output value, $v^*_{yij}$. For example, LAOU 120 could be a diode or a small amplifier which adds the analog values from LAM4 $112^4$. One implementation of LAMs 112 could be capacitors on which the analog voltage can be stored.

In the local analog memory (LAM$_x$) $112^x$, in addition to the local input, state, and output memory elements, some additional output memory cells are used in LAM4 $112^4$. These additional output memory cells provide for the application of a local analog output unit (LAOU) 120 where the analog memory values are combined by simple analog circuits (using programmable switches one particular operator can be selected). These elements can also be used (in an analogic algorithm) for the implementation of branching into several parallel branches (time multiplexing with analog signal values).

From the analog portion of the CNN of the present invention that is shown in FIG. 4a, the signal $v^*_{yij}$ is applied in FIG. 4b to a simple bipolar/unipolar shift unit 122. Bipolar/unipolar shift unit 122 to transform the analog output signal to logic values with consecutive values being stored in a local logic memory register (LLM) 114. LLM 114 may be implemented, for example, by a multi-stage shift register where the converted logic signals are stored in analog form (just yes or no). Having several consecutive logic values stored in LLM 114 allows for the implementations of branching in the analogic algorithms (at logic signal arrays).

The results stored in LLM 114 are then combined in LLU 116. LLU 116 is programmable to combine the logic values stored in LLM 114 into a single output. Further, LLU 116 is programmable from GAPU 102 and may be implemented, e.g., as a memory or a PLA. Thus the logical output signal, $Y_{ij}$, provides a "yes" or "no" response to whether the feature that the CNN was programmed to detect by templates A and B was observed. For example, vertical edges and corners and where they occurred might be detected. The analog-logical (analogic) processing, as illustrated in FIGS. 4a and 4b, is serial with the analog processing performed first followed by the logical processing.

Throughout the analogic processing discussed above with respect to FIGS. 4a and 4b, LCCU 118 controls the timing of the various steps in the processing by means of a series of switches that are controlled by GAPU 102. These switches interface with the various elements of FIG. 4a via the broken line segments shown in that figure thus controlling the operation of LAMs 112. The switches of LCCU 118 can be implemented several ways including, for example, MOS transistors or SCRs, with the switches being locally the same in each cell.

These configurations are the same for all cells. If there is a global control unit which sends the switch configurations to each cell, the same binary switch configuration code is sent to each cell. Then when the next instruction comes a different switch configuration code will be sent from switch configuration register (SCR 115) of GAPU 102.

In the previous design of the CNN it was necessary to have multiple planes, each working in parallel and each looking for the occurrence of a different feature. This approach is still possible with the present invention, however, since the present invention makes CNNs programmable it is now possible to use the same hardware to search for different features in a serial mode which greatly reduces the interface hardware necessary for implementation of the CNN supercomputer of the present invention. This does not present a problem since the CNN supercomputer of the present invention operates very fast in real time and if there are five things that need to be searched for the CNN supercomputer is cycled through five times. The key here is that it is so fast that it appears to be nearly instantaneous.

Since the CNN supercomputer employees multiplexing and the results are locally stored in each plane, the results from several planes that have been processed simultaneously can be combined with no communication cost since everything is locally stored. This is key. Also analog signals are used so that there is no need for A-D converts in each cell; the actual signals are stored. The local connectivity here provides a high speed supercomputer that is very small and uses very little power.

Figure 5:
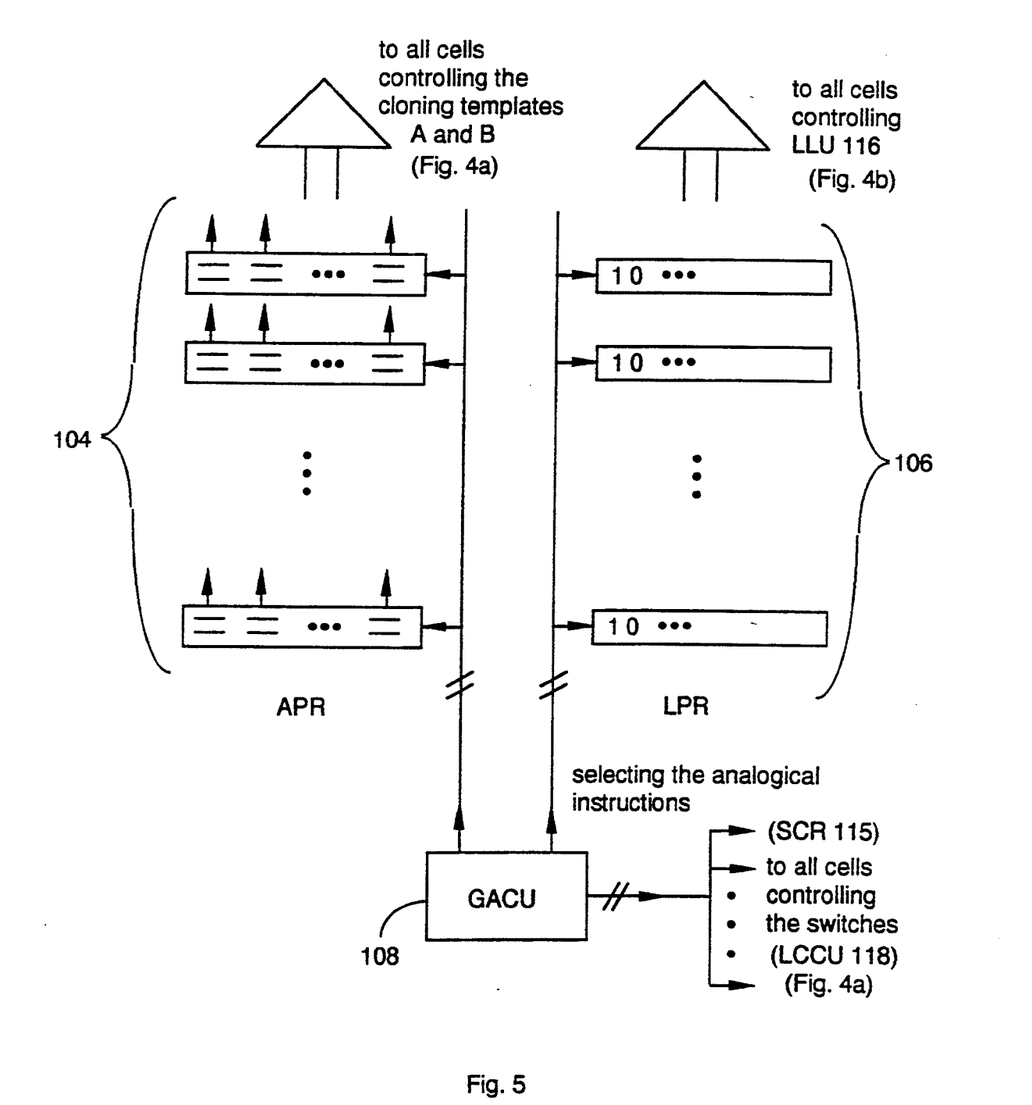
FIG. 5 is an expanded block diagram representation of GAPU of FIG. 3c.

FIG. 5 is a block diagram representation of GAPU 102 which as stated in relation to FIG. 3c has four parts:
  the global analog program register (APR) 104 for storing the analog programming instructions and different templates for each cell which are the same for each cell (e.g. by using capacitor arrays);
  the global logic program register (LPR) 106 for storing the different logic programming instruction and codes of LLU 116 (same for all cells in the plane);
  the global switch configuration register (SCR) 115 for storing the switch configuration of all cells; and
  the global analogic control unit (GACU) 108 which controls the overall timing for the CNN plane and when each instruction from APR 104 and LPR 106 are entered into LAM 112 and LLU 116, respectively of each cell (the control sequences stored here represent the analogic machine codes of the analogic CNN algorithm) with the use of two global clocks, one determined by the analog dynamics and the other determined by the logic units.

To overcome the on-chip size limitations of these 4 subunits, especially the size limitations of APR 104, the division of the on-chip and off-chip analog program storage can be arranged to introduce analog-cache storage (ACS) as well to supplement the on-chip APR 104 storage.

The analogic CNN algorithms can be described by an analogic CNN language (or an equivalent block diagram). This language is translated by a computer to the analogic CNN machine code.

In most applications the radius of interconnects with each CNN will be equal to 1, thus there will be no more than 19 individual signal values to be stored in the registers of APR 104, thus 19 numbers (an analog instruction) will be enough to fully address the processor. Each of the APR registers of FIG. 5 represent different analog instructions. These instructions consist of all of the possible values for each of the A and B templates, as well as the bias current, I. The bias current can also be thought of as a threshold. Each contains an instruction to program the individual templates: A with 9 numbers ($3 \times 3$ matrix with values for feedback to the connected cells of the CNN), B with 9 numbers ($3 \times 3$ matrix with values for feedforward to the connected cells of the CNN), and I with 1 number for the bias current of the single cell itself. Similarly, if $r=2$ then 51 numbers will be needed since the A and B templates each will be $5 \times 5$, if $r=3$ then 99 numbers since the A and B templates each will be $7 \times 7$, etc.

Similarly the size and number of each register in LPR 106 is dependent upon the number of logic values to be combined and the number of different logic instructions. The example below illustrates this.

The selection of the appropriate analog templates, i.e. analog instructions, and the logical instructions is made by GACU 108. Suppose the next instruction is a corner detecting template. GAPU 108 then loads the appropriate local programming values of the A, B and I templates. Like in digital microprocessors the program is organized in the sequence of the data and instructions. GACU 108 is a sequential logical store of which instructions to select and in what order from APR 104 and LPR 106 to detect the desired pattern, etc. The operation of GACU 108 is also illustrated in the detailed example below.

Considering the standard fully connected analog neural networks, it is obvious that the latter condition is unimplementable. Partly because the storage space of a single program "instruction" is prohibitively large, partly because the reprogrammability takes more time than the execution time itself. This is a point where the local connectivity comes into the picture. Namely, if we consider a CNN cloning template as an analog instruction, then we have only one or two dozen analog values for an instruction to be stored even if we have thousands of processors. On the contrary, in case of a fully connected analog synchronous neural network (e.g., the Intel 80170), we have about 10,000 analog values for 64 processors and their reprogrammability takes considerable time.

EXAMPLE

The task: Given a gray scale image, detect all points in the intersection of vertical and diagonal edges.

Figure 9:
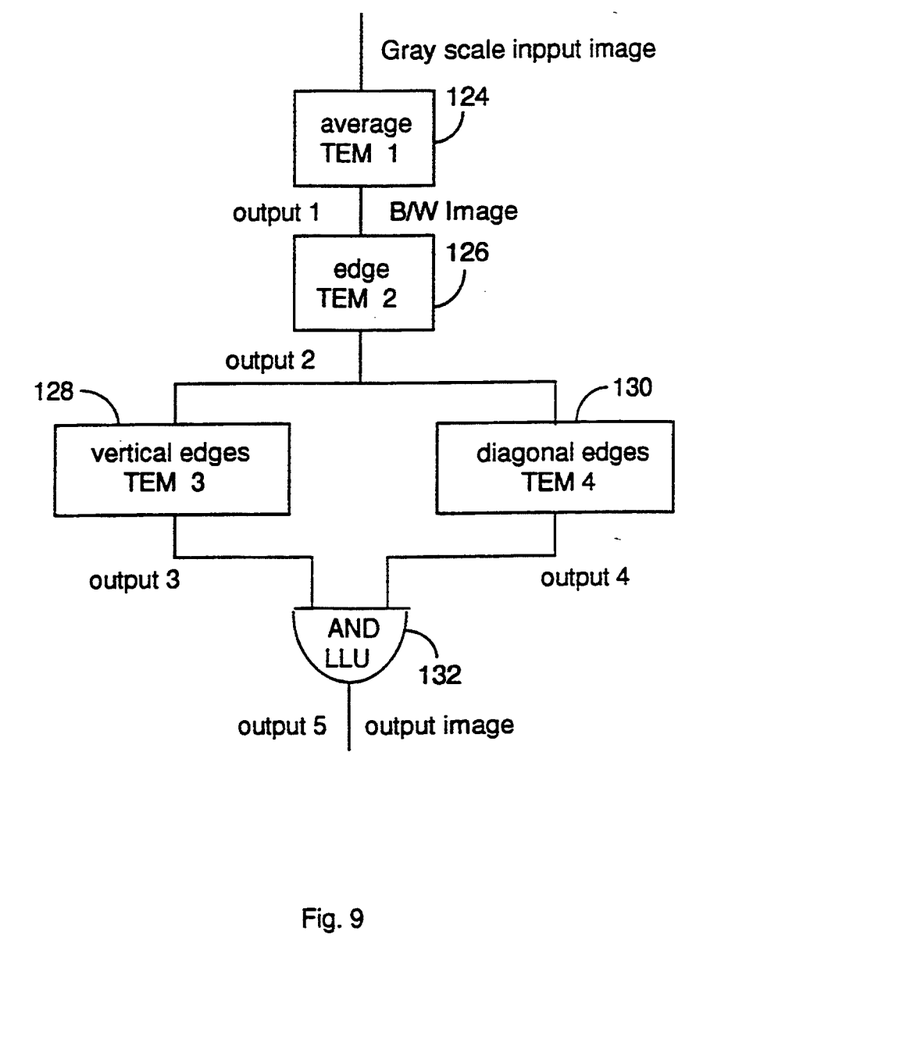
FIG. 9 is a flow diagram of an analogic (dual) CNN algorithm to solve a stated problem in an example.

FIG. 9 is a flow diagram of the analogic (dual) CNN algorithm for solving the stated problem. The first step is to average the intensity of the pixels in the image (block 124), next edges are detected (block 126) followed by the detection of the vertical edges (block 128) and the diagonal edges (block 130), and the final step of the logical combination of the results from the vertical and diagonal edge detections (block 132). As was discussed above, the present invention is capable of performing operations in series with a single chip that in earlier CNNs would have to be performed in parallel using several chips. Thus, each of the four analog steps (blocks 124-130) can be performed individually with a single chip in series with the final logical result working only on the information from the third and forth steps That is, the analog program register (APR) 104 contains the following content (if the template matrices are coded row wise):

```
          A                              B                           I
TEM1 [0 1 0 1 2 1 0 1 0][0  0   0   0  0 0   0   0   0 ][ 0  ]

TEM2 [0 0 0 0 2 0 0 0 0][-1/4 -1/4 -1/4 -1/4 2 -1/4 -1/4 -1/4 -1/4][-1.5]

TEM3 [0 0 0 0 1 0 0 0 0][-1/4  1  -1/4  -2  2  -2 -1/4  1  -1/4][-6.2]

TEM4 [0 0 0 0 1 0 0 0 0][ 1  -1/4 -2  -1/4  2 -1/4 -2 -1/4  1 ][-1.5]
                                     APR
```

(blocks 28 and 130). That is not to say, however, that the present invention is incapable of operating in the parallel mode that the prior art could operate in, it can. The present invention could also perform a combination of series and parallel operations which the block diagram might indicate. The deciding factors are the speed which is necessary and the cost and size of the hardware to perform the calculations in any of the optional ways. The key point here is that a single programmable chip can be capable of performing all of the steps of an algorithm.

Assuming that r=1 in the CNN implementation that is being used, the A and B templates will each be 3×3. Thus, the three registers of GAPU 102: APR 104, LPR 106, and switch configuration register of GACU 108. For purposes of this example, it is assumed that the actual switches in LLU 116 that are controlled by GACU 108 are SCRs, thus in this example, the switch configuration register is called the SCR register.

The SCRs are introduced to decrease the number of wires from GACU 108 necessary to control the switches.

The four templates used in the CNN algorithm are as follows:

TEM1 (gray scale average)

$$A = \begin{bmatrix} 0 & 1 & 0 \\ 1 & 2 & 1 \\ 0 & 1 & 0 \end{bmatrix} \quad B = 0 \quad I = 0$$

TEM2 (edge detector)

$$A = \begin{bmatrix} 0 & 0 & 0 \\ 0 & 2 & 0 \\ 0 & 0 & 0 \end{bmatrix} \quad B = \begin{bmatrix} -0.25 & -0.25 & -0.25 \\ -0.25 & 2 & -0.25 \\ -0.25 & -0.25 & -0.25 \end{bmatrix} \quad I = -1.5$$

TEM3 (vertical line detector)

$$A = \begin{bmatrix} 0 & 0 & 0 \\ 0 & 1 & 0 \\ 0 & 0 & 0 \end{bmatrix} \quad B = \begin{bmatrix} -0.25 & 1 & -0.25 \\ -2 & 2 & -2 \\ -0.25 & 1 & -0.25 \end{bmatrix} \quad I = -6.25$$

TEM4 (diagonal line detector)

$$A = \begin{bmatrix} 0 & 0 & 0 \\ 0 & 1 & 0 \\ 0 & 0 & 0 \end{bmatrix} \quad B = \begin{bmatrix} 1 & -0.25 & -2 \\ -0.25 & 2 & -0.25 \\ -2 & -0.25 & 1 \end{bmatrix} \quad I = -6.25$$

The logic program register (LPR) 106 contains a single element with the content of a 2 input AND (see FIG. 9, block 132) (if coded row-wise as a 2-input memory truth table):

```
[1 1 1 1 0 0 0 1 0 0 0 0]LLU1 (AND)
 LPR
```

The switch—configurations stored in the switch configuration register (SCR)—have the following states and generate the corresponding actions:

S0: reset (input, initial state, and all output switches are off).
S2: start transient
S3: store analog output in LAM(1), i.e., the first element in the memory LAM4.
S4: send the analog output stored in LAM4(2) to LLM4(1) after shifting the LLM4 register by one step right (LAOU 120 is now just a single wire)
S5: feedback the stored analog output (LAM4(1)) to the input/initial state.
S6: activate the local logic unit 116.
S7: store the analog output in LAM4(2).

In case of having 3 wires to control the local communication and control unit (LCCU) 118, the SCR stores the codes of the different states, for example, as

|       | S0 | S1 | S2 | S3 | S4 | S5 | S6 | S7 |
|-------|----|----|----|----|----|----|----|----|
| wire1 | 0  | 1  | 0  | 1  | 0  | 1  | 0  | 1  |
| wire2 | 0  | 0  | 1  | 1  | 0  | 0  | 1  | 1  |
| wire3 | 0  | 0  | 0  | 0  | 1  | 1  | 1  | 1  |

The LCCU 118 decodes the 3 bit codes to the 8 states of switch configurations (switch position arrangements) providing the cell functions described above.

Now, defining the machine code of the program, namely, the set of instructions of the global analog/logic (analogic) control unit (GACU) 108. The contents of the registers (APR, LPR, SCR) have already been defined. By selecting a single item within a register, all the cells in the CNN are controlled in the same way. Selecting an analog template SEL(TEM1), all the cell's cloning templates (transconductances in case of silicon implementation) will be controlled to realize the given template. Selecting a given local logic unit function, SEL (LLU), in all cells the given truth table (or the PLA content) will be loaded. Selecting a given switch configuration, SEL(Si)/state, the appropriate switch positions will be set in all cells.

Keeping these in mind, the machine code of the CNN program will be as follows:

| Instructions | Comments |
| --- | --- |
| BEGIN | program start |
| SEL(S0); | reset |
| SEL(S1); | input |
| SEL(TEM1); | tune to TEM1 (gray scale average) each cell |
| SEL(S2); | start the CNN transient |
| SEL(S3); | store the output in LAM4(1) (B/W image) |
| SEL(S5); | feedback this stored output to the input/initial state |
| SEL(TEM2); | tune to TEM2 (edges) |
| SEL(S2); | start the CNN transient |
| SEL(S3); | store the output in LAM4(1) |
| SEL(S5); | feedback this stored output to the input/initial state |
| SEL(TEM3); | tune to TEM3 (vertical lines) |
| SEL(S2); | start the CNN transient |
| SEL(S7); | store the output in LAM4(2) |
| SEL(S4); | store the vertical lines in LLM(1) |
| SEL(S5); | feedback the B/W image to the input/initial state |
| SEL(TEM4); | tune to TEM4 (diagonal lines) |
| SEL(S7); | store this output in LAM4(2) |
| SEL(S4); | after shifting the vertical lines to LLM(2) store the diagonal edges in LLM(1) |
| SEL(LLU1); | load the AND function to the LLU 116 |
| SEL(S6); | calculate the output image (in each cell) |
| END | program termination |

Using a higher level language for describing the algorithm of FIG. 9, a CNN universal machine compiler can be used to translate it into the CNN machine code described above.

Figure 10A:
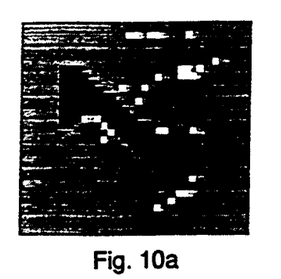
FIGS. 10a–10f are graphical illustrations of the input signal to and the resultant signals at each step the flow chart of FIG. 9.
Figure 10B:
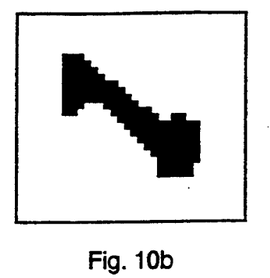
Figure 10C:
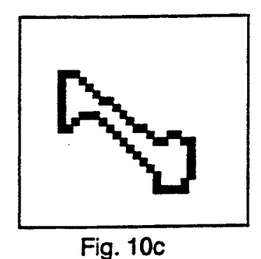
Figure 10D:
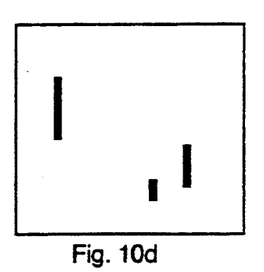
Figure 10E:
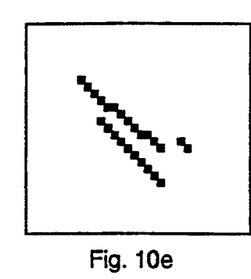
Figure 10F:
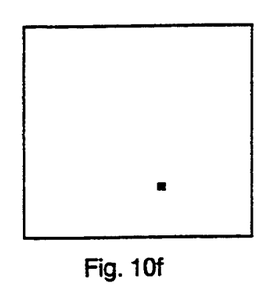

In the specific gray scale image of FIG. 10a, the result following the gray scale averaging of block 124 (FIG. 9) is shown in FIG. 10b, the result of the edge detection of block 126 is shown in FIG. 10c, the result of vertical edge detection of block 128 is shown in FIG. 10d, the result of diagonal edge detection of block 130 is shown in FIG. 10e, and the ANDing of the results of blocks 128 and 130 by block 132 is shown in FIG. 10f where there is only one pixel that is included in both a vertical and a diagonal edge.

Implementation

Figure 8:
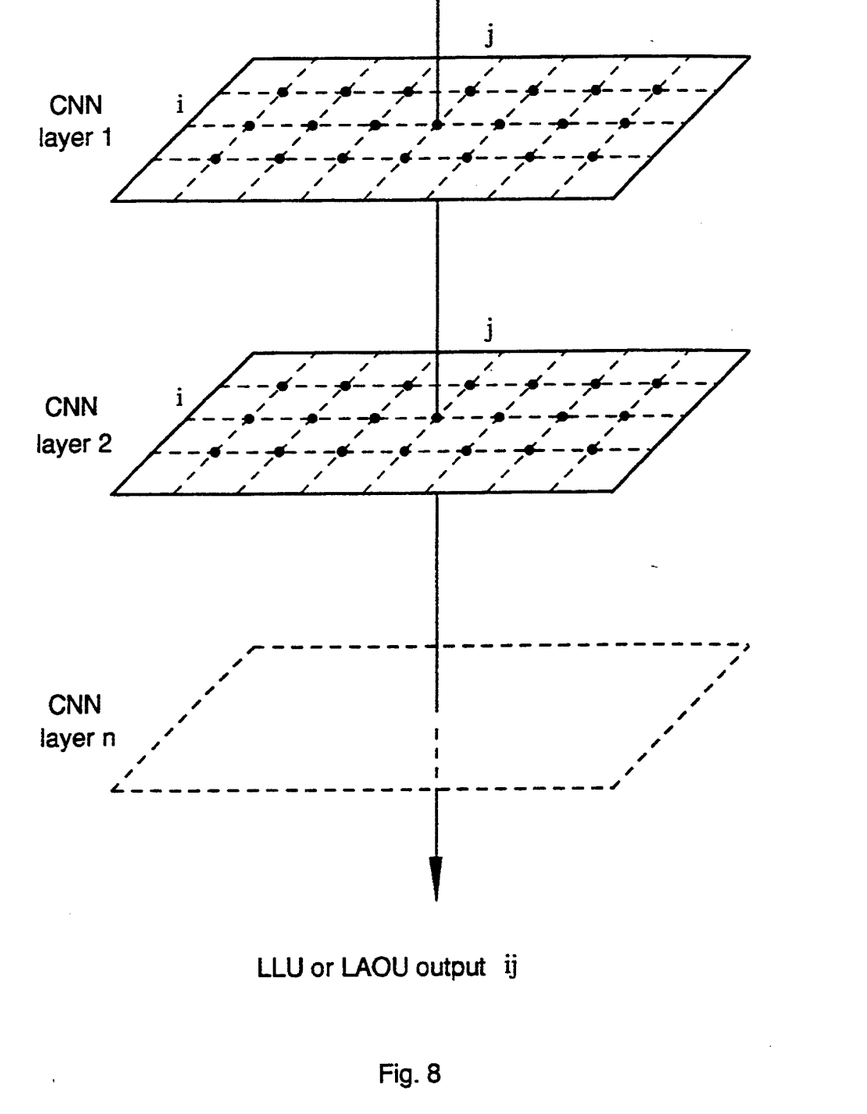
FIG. 8 illustrates the logical outputs of each of the layers of the CNN machine.

FIG. 8 illustrates two features of the present invention. One the as discussed above the CNN of the present invention, as was true of the prior art, can have multiple layers with each layer simultaneously processing a different aspect of the identification process (e.g. one looking for an upper right corner, another looking for a diagonal center line, and another looking for a lower left corner), or, since the present invention provides a programmable CNN, each layer could represent a subsequently performed step of the overall algorithm. The second feature of the present invention is a unique wireless non-optical method for outputting information from the CNN analog array of the present invention via electromagnetic waves generated by nonlinear oscillations and chaos which will be discussed further below in relation to FIG. 6.

The basic logic analog cell processor 110 of the CNN network may be any analog two-port circuit with an input (u), an output (y), and a state (x). In addition to the original cell, simple extensions (e.g., adding an output capacitor, using a simple thresholding unit, etc.) or more complex cells (e.g., Chua's circuit for chaos) may be applied, providing a variety of nonlinear bifurcation phenomena (for example, the chaos circuit could be inserted into block "f" of FIG. 4a).

Figure 6:
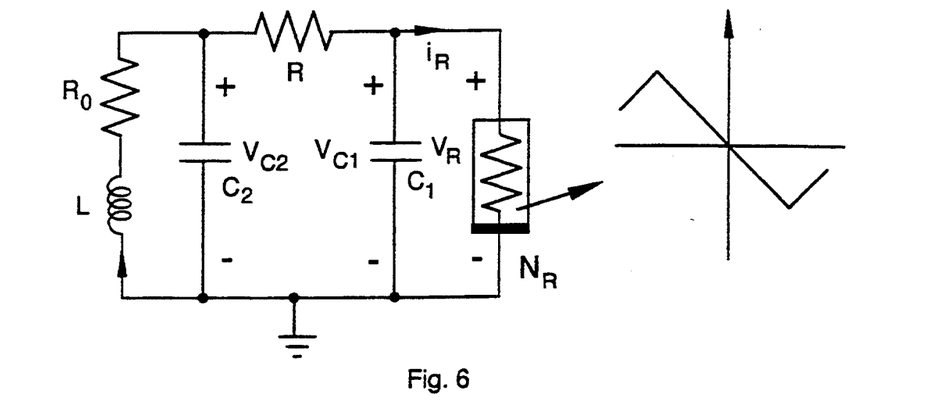
FIG. 6 is a schematic diagram of a chaos circuit of the present invention.

One such circuit is the generalized Chua's circuit of the present invention, shown in FIG. 6, in which various VLSI circuits for realizing negative resistances, inductances and capacitors can be used to implement all active or dynamic circuit elements on a chip.

FIG. 6 illustrates the generalized chaos circuit of the present invention. This circuit includes two standard linear capacitors C1 and C2 connected between return and the opposite end of a standard linear resistor R, connected across one of the capacitors (C1 in the schematic illustration) is a non-linear resistor $N_R$, and across the other capacitor (C2 in the schematic) is a series connection of a standard linear inductor L and a resistor $R_o$. $N_R$ is a non-linear resistor, like a diode with the characteristic shown to the right. Resistor $R_o$ is the new element that distinguishes the circuit from earlier chaos circuits.

One of the properties of this circuit is that not only can it oscillate but it can also produce a new phenomena called chaos. Chaos is irregular oscillation or non-periodic oscillation that is pseudo random. The beauty of this circuit is that for different parameters it performs differently. For some parameters it just sits there. In it's simplest mode it will perform like a flip-flop. Then with other values it will oscillate periodically, but not necessarily in a sine wave, maybe in a triangular wave, nevertheless it will be periodic. Then with other parameter values (by tuning the resistor R) the oscillations become pseudo random, for all practical purposes random. The beauty of this is that now it is possible to have a CNN where every cell is an identical chaos generator. But that is just a special case since the circuit of FIG. 6 achieved by changing the values of the components and thus changing the performance of the circuit to one of the other possible states. This gives the user the ability to solve partial differential equations, produce non-linear waves like in the ocean, autowaves which have many applications (e.g. image processing).

It also shows that using the CNN concept the same simple analog unit can do a lot of things. It is an important circuit in that such a simple circuit can do almost everything locally. This emphasizes the fact that this is an analog processing array and to do almost everything it can have this simple circuit. Additionally, in part three below it is shown that these circuits are capable of solving not only simple PDEs (partial differential equations), like a diffusion equation in a finite spacial degree. With the addition of a simple capacitor at the output it will generate a signal array that approximates a wave equation. If $N_R$ is changed to function in the region of a negative diode slope there is again a new type of PDEs and there is the capability of almost producing the most complex PDEs.

At present $N_R$ can be built with 6 transistors and an operational amplifier, however it can be also be implemented as an integrated circuit. As to the silicon implementation of the inductor, several well known equivalent circuits can be used. One possibility is the use of a gyrator which can simply be implanted by using two voltage controlled current sources (or transconductances, used extensively in the CNN and general neural network implementations). The templates can be implemented in several ways (e.g. by means of transcunductance amplifiers, or, in the simplest cast, by a resistor grid).

Figure 7A:
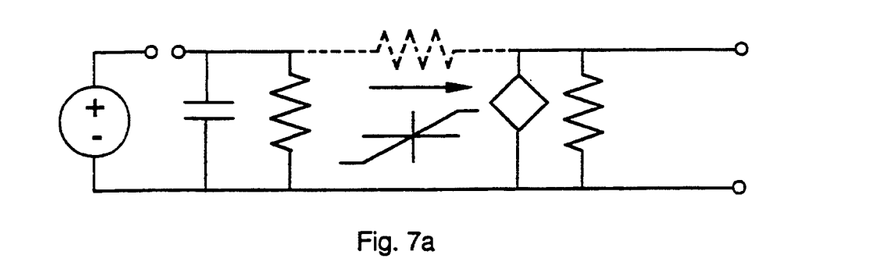
FIGS. 7a–7c illustrates the equivalent circuit of three different states of the chaos generator of FIG. 6.
Figure 7B:
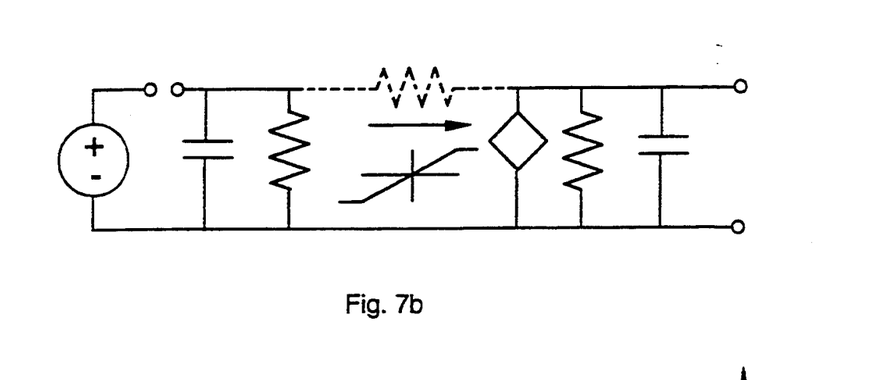
Figure 7C:
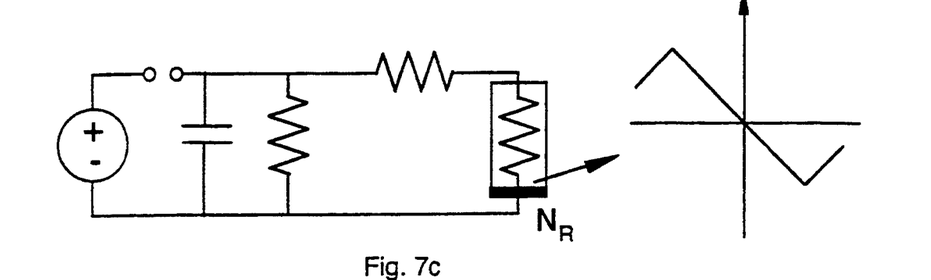

FIGS. 7a–7c illustrates the equivalent circuit of three different special cases of the chaos generator of FIG. 6.

Part 2

To increase the throughput of the CNN universal chip architecture, an input sensor is placed at each CNN cell unit (optical, chemical, electromagnetic, thermal, etc., sensor arrays). A unique way of increasing the output throughput is by wireless non-optical EM Wave output detection. The key idea is to use oscillating or chaotic CNN detector templates. The presence of a feature is then detected by radiation using an electromagnetic sensing unit (in the vicinity). In doing so, the very high speed of the CNN universal chip will not be slowed down by the row-wise output of the cell unit array.

If each cell in each layer has information to be outputted it is impractical to have 10,000 output wires. With the selection of the chaos circuit of FIG. 6 as the basic circuit for each cell, high frequency oscillations can be generated when there is a match with those oscillations being detectable without any additional wires for providing the output signals. With the proper selection of the cell circuit, the radiated signals can have a high frequency which can be detected with an antenna and frequency detector that is external to the IC chip on which the CNN machine is implemented.

So essentially every cell is capable of emitting high frequency radiation. This can be accomplished through the use of the chaos circuit of the present invention of FIG. 6, or another circuit that functions similarly, and specific templates drive the cell to oscillate when the desired feature is detected. For example if an edge is to be detected, the cells that detect the edge will oscillate, also if an edge located anywhere is the input pattern is to be detected all that has to be detected is the mere presence of an edge anywhere then the mere presence of oscillation is all that has to be detected. The antenna can be implemented in several ways, one might be as an additional layer on the CNN multi-layer machine chip, or it could be external since the high frequency oscillation will occur on each of the wires that exit the chip. Through the use of wireless detection techniques the output throughput of CNNs is drastically increased.

Part 3

The third key element of this invention is the use of an analog or digitally emulated CNN universal chip architecture in an array to form the CNN array supercomputer. It can be used for solving a very broad class of nonlinear partial differential equations (PDEs) at a fraction of the time or cost of an existing supercomputer.

The physical implementation of the array is simple; the individual CNN universal chips are placed next to each other in a plane with connections between boundary cells only (possibly with high speed connections). As to the GAPU, it can be repeated in every chip or united in a single GAPU. Another possibility, due to the regular structure, is to stack the individual CNN universal chips upon each other. The two methods can also be combined depending on the actual size and number of layers needed for solving a given problem.

This CNN array supercomputer can be used for solving nonlinear partial differential equations (PDEs) in the following way. The spatial approximation can be defined on the same grid as the CNN array. Hence, there is one-to-one correspondence between the processor grid and the spatial grid of the PDE. The analog processor of the cell unit is made to be equivalent to the spatially discretized circuit model of the relevant PDE. For example, FIGS. 7a–7c show three different analog processor elements for certain diffusion-type, wave-type and wave-type-with-energic PDEs, respectively. Note that the spatial approximation is not necessarily defined on the same grid as the CNN array.

Functionalities

As it was pointed out, the CNN universal machine is universal in a very broad sense. Thus, practically any conceivable analogic model can be described by an analogic algorithm solvable on the CNN universal machine. In addition, the architecture is optimal in a sense that by finding the minimal canonical analog circuit cell, the physical solution is optimized with respect to time and area.

Next, there here are some examples to motivate the use of the CNN universal machine. The architecture was motivated by several biological and physical systems. The combination of analog array dynamics and logic reflects some aspects of cerebral hemispheric asymmetry in the human brain (on the cognitive level) as well as some living neural constructions (e.g., strata of neurons of different sensory modalities packed upon each other combining locally corresponding neurons). A simple structure is shown in FIG. 6. The fact of having about 30 different image maps of the single visual image preprocessed by the retina, in our brain, is another motivation. Many of these maps have already been converted into a sequence of CNN templates which can be represented by an analogic algorithm. Some examples include complicated retina models and LGN models with conical feedback. The programmable character of the CNN universal machine makes possible the programmable bionic modules.

Many important types of canonical PDEs on a finite resolution grid can be represented by analogic algorithms. Thus, problems like calculating stress distribution in key mechanical structures (e.g., airplanes) can efficiently be solved. The reaction diffusion equations of chemistry, the autowaves in photochemistry, spiral waves, solutions and other complicated 2D or 3D patterns are just a few examples.

In our machine, several 2D layers are represented by a simple layer used in a time-multiplex mode. This is made possible by using local analog and logic memories. This allows the running of analogic algorithms in a very efficient way and the processing of parallel algorithmic branches (in addition to the serial ones) without leaving the chip. Color representation is a good example to use this capability. The three color layers are represented by a single CNN layer using three local memory output cells.

As one of the most complex type spatio-temporal behavior, spatio-temporal chaotic dynamics can be calculated. Several complicated turbulence phenomena become tractable in this way. The CNN machine can implement stocastic cellular models as well.

The analogic algorithms represent a new world of analogic software. Indeed, some elementary "subroutines" of simple CNN templates are already emerging. Thus, the software base is already developing for the implementation of the CNN universal machine.

Validation of the New Machine

Elementary parts of this new architecture have already been fabricated and tested (CNN chips, simple hardware emulator, etc.) and complex examples were solved by software simulations of the CNN universal machine.

To those skilled in the art to which the invention disclosed herein relates, many changes in construction and widely differing embodiments and applications of the invention will suggest themselves without departing from the spirit and scope of the invention. The disclosures and the descriptions herein are purely illustrative and are not intended to be in any sense limiting. The actual scope of the invention described herein is only limit by the scope of the appended claims.

TABLE 1

CNN:
Cellular analog programmable multidimensional processing array with distributed logic and memory

| Grid types | Processor types | interaction types | Modes of operation |
|---|---|---|---|
| square, hexagonal tridiagonal single and multiple grid-size (coarse and fine grid, etc) equidistant and varying grid size (e.g. logarithmic like in the retina) planar and circular lattice (3D) | linear (or small signal operation in the piecewise-linear sigmoid characteristics) sigmoid (including unity gain, high gain, and thresholding) Gaussian (inverse Gaussian) first, second and higher order (e.g. one, two, or more capacitors) with or without local analog memory with or without local logic | linear (one or two variables) memoryloss nonlinear (one, two, or more variables) memoryloss delay-type dynamic (lumped) symmetric and non-symmetric fixed template or programmable template (continuously or in discrete values) sources - including noise | continuous-time, discrete-time (synchronous or asynchronous), time-varying local mode and propagating mode fully analog or combined with logic (dual computing CNN) transient-, settling-, oscillating-, or chaotic mode stochostic mode |

What is claimed is:

1. A cellular neural network comprising:

a plurality of identical analog cells arranged in a multi-dimensional lattice array having multiple dimensions of said plurality of identical analog cells organized in n layers of cells wherein n is a positive integer and each cell has controllable operational signal values, the cells closest to any single cell in each of the multiple dimensions being neighbor cells that form a first layer of neighbor cells with each of said neighbor cells being identically interconnected with said any single cell depending on their relative position as a neighbor cell to said any single cell, all of the cells separated from any single cell by one other cell in any of the multiple dimensions form a second layer of neighbor cells that are identically interconnected with said any single cell depending on their relative position as a neighbor cell to said any single cell, and the remainder of the n layers of neighbor cells expanding concentrically from said second layer of neighbor cells in the multiple dimensions around said any single cell forming additional layers of neighbor cells to the most distant of said identical analog cells of said multi-dimensional lattice array from said any single cell with said layers of neighbor cells identically interconnected with said any single cell depending on their relative position as a neighbor cell to said any single cell;

a global analogic programming unit interfaced with each of said plurality of identical analog cells within said cellular neural network conveying identical analog and logic values to each said cell;

each of said identical analog cells programmably interacting non-linearly and continuously in time with selected layers of said n layers of neighbor cells and at least the cells of said first layer of neighbor cells with independently selected programmable parameters for each cell of said n layers depending on the relative position of each cell in any of said n layers to said any single cell;

wherein each of said identical analog cells comprises:

a non-linear operationally reprogrammable feed-forward section coupled to each cell in each of the selected layers of said n layers of neighbor cells to influence the operational signal values of each cell in said selected layers of neighbor cells;

a non-linear operationally reprogrammable feedback section coupled to each cell in each of the selected layers of said n layers of neighbor cells to influence the operational signal values of each cell in said selected layers of said neighbor cells;

a non-linear operationally reprogrammable self feedback section coupled to the cell being defined here to influence the operational signal values of said cell being defined here;

a local analog memory unit coupled to said global analogic programming unit and said feed-forward, feedback and self feedback sections of said cell being defined here, to store analog values for use by said cell being defined here;

an operationally reprogrammable local analog output unit coupled to said local analog memory unit to operate with said stored values that are indicative of the analog operation of said cell being defined here;

a local logical memory resister coupled to said local analog output unit to store logical values for internal use by said cell being defined here;

an operationally reprogrammable local logic unit coupled to said local logic memory register to process the operational logical values of said cell being defined here; and a local communications and control unit coupled to each of said feed-forward, feedback and self feedback sections, said local analog memory unit, said local analog output unit, said local logical memory register and said local logic unit each of said cell being defined here, and said global analogic programming unit to control internal and external functions and configurations of said cell being defined here in cooperation with said global analogic programming unit;

each of said feed-forward section, feedback section, self feedback section, local analog output unit and local logic unit are programmable by said global analogic programming unit.

2. A cellular neural network as in claim 1 wherein each of said identical analog cells further comprises:
- a first operationally reprogrammable template unit coupled to said global analogic programming unit to receive and apply feedback values to said feedback and self feedback sections to establish feedback signals to each cell in the selected layers of cells; and
- a second operationally reprogrammable template unit coupled to said global analogic programming unit to receive and apply feed-forward values to said feed-forward section to establish feed-forward signals to each cell in the selected layers of cells.

3. A cellular neural network as in claim 1 wherein said global analogic programming unit comprises:
- an analog program register to store analog program steps in the form of analog signal values that correspond to feedback and feed-forward signal levels and bias current values needed to perform particular analog functions by each cell in the selected layers of cells in said cellular neural network;
- a logical program register to store logic function instructions needed to perform particular logic functions by each cell in the selected layers of cells in said cellular neural network;
- a switch configuration register to store timing instructions needed to perform particular functional configurations by each cell in said cellular neural network; and
- global analogic control unit to store instructions for programming said local analog output unit of each cell of said cellular neural network and to select instructions from said analog program register, said logical program register and said switch configuration register in response to a global analogic program to perform a particular function.

4. A cellular neural network as in claim 3 wherein each of said identical analog cells further comprises:
- a first operationally reprogrammable template unit coupled to said global analogic programming unit to receive and apply feedback values to said feedback and self feedback sections to establish feedback signals to each cell in the selected layers of cells; and
- a second operationally reprogrammable template unit coupled to said global analogic programming unit to receive and apply feed-forward values to said feed-forward section to establish feed-forward signals to each cell in the selected layers of cells.

5. A cellular neural network as in claim 2 wherein said first and second operationally reprogrammable template unit each comprise a plurality of programmable variable gain amplifiers to establish the feedback and feed-forward signals for the selected number of layers of neighbor cells.

6. A cellular neural network as in claim 1 wherein said analog signal values stored by said analog memory unit are representative of input, state and output signal values of said cell being defined here.

7. A cellular neural network as in claim 1 wherein said global analogic programming unit selectively programs said cellular neural network in a time-multiplex fashion.

8. A cellular neural network as in claim 7 wherein:
- said local analog memory unit retains the analog output signal results for various time periods as said global analogic programming unit operates in the time-multiplex fashion; and
- said local analog output unit combines said output signal results for various time periods in response to said global analog programming unit.

9. A CNN supercomputer comprising:
- a plurality of cellular neural networks connected in parallel, wherein each of said cellular neural networks comprises:
- a plurality of identical analog cells arranged in a multi-dimensional lattice array having multiple dimensions of said plurality of identical analog cells organized in n layers of cells wherein n is a positive integer and each cell has controllable operational signal values, the cells closest to any single cell in each of the multiple dimensions being neighbor cells that form a first layer of neighbor cells with each of said neighbor cells being identically interconnected with said any single cell depending on their relative position as a neighbor cell to said any single cell, all of the cells separated from any single cell by one other cell in any of the multiple dimensions form a second layer of neighbor cells that are identically interconnected with said any single cell depending on their relative position as a neighbor cell to said any single cell, and the remainder of the n layers of neighbor cells expanding concentrically from said second layer of neighbor cells in the multiple dimensions around said any single cell forming additional layers of neighbor cells to the most distant of said identical analog cells of said multidimensional lattice array from said any single cell with said layers of neighbor cells identically interconnected with said any single cell depending on their relative position as a neighbor cell to said any single cell;
- a global analogic programming unit interfaced with each of said plurality of identical analog cells within said cellular neural network conveying identical analog and logic values to each said cell;
- each of said identical analog cells programmably interacting non-linearly and continuously in time with selected layers of said n layers of neighbor cells and at least the cells of said first layer of neighbor cells with independently selected programmable parameters for each cell of said n layers depending on the relative position of each cell in any of said n layers to said any single cell;
- wherein each of said identical analog cells comprises:
  - a non-linear operationally reprogrammable feed-forward section coupled to each cell in each of the selected layers of said n layers of neighbor cells to influence the controllable operational signal values of each cell in said selected layers of neighbor cells;
  - a non-linear operationally reprogrammable feedback section coupled to each cell in each of the selected layers of said n layers of neighbor cells to influence the controllable operational signal values of each cell in said selected layers of said neighbor cells;
  - a non-linear operationally reprogrammable self feedback section coupled to the cell being defined here to influence the operational signal values of said cell being defined here;
  - a local analog memory unit coupled to said global analogic programming unit and said feed-forward, feedback and self feedback sections of said cell being defined here, to store analog values for use by said cell being defined here;

an operationally reprogrammable local analog output unit coupled to said local analog memory unit to operate with said stored values that are indicative of the analog operation of said cell being defined here;

a local logical memory register coupled to said local analog output unit to store logical values for use by said cell being defined here;

an operationally reprogrammable local logic unit coupled to said local logic memory register to process the operational logical values of said cell being defined here; and a local communications and control unit coupled to each of said feed-forward, feedback and self feedback sections, said local analog memory unit, said local analog output unit, said local logical memory register and said local logic unit of the cell being defined here, and said global analogic programming unit to control internal and external functions and configurations of said cell being defined here in cooperation with said global analogic programming unit;

each of said feed-forward section, feedback section, self feedback section, local analog output unit and local logic unit being programmable by said global analogic programming unit.

* * * * *